US012645025B2

(12) United States Patent
Suganuma et al.

(10) Patent No.: US 12,645,025 B2
(45) Date of Patent: Jun. 2, 2026

(54) MULTICORE OPTICAL FIBER AND OPTICAL TRANSMISSION SYSTEM

(71) Applicant: SUMITOMO ELECTRIC INDUSTRIES, LTD., Osaka (JP)

(72) Inventors: Takahiro Suganuma, Osaka (JP); Takemi Hasegawa, Osaka (JP); Tetsuya Hayashi, Osaka (JP); Hirotaka Sakuma, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 306 days.

(21) Appl. No.: 18/026,965

(22) PCT Filed: Sep. 24, 2021

(86) PCT No.: PCT/JP2021/035093
§ 371 (c)(1),
(2) Date: Mar. 17, 2023

(87) PCT Pub. No.: WO2022/065435
PCT Pub. Date: Mar. 31, 2022

(65) Prior Publication Data
US 2023/0333312 A1 Oct. 19, 2023

(30) Foreign Application Priority Data

Sep. 24, 2020 (JP) ................................. 2020-159586

(51) Int. Cl.
*G02B 6/02* (2006.01)
*G02B 6/036* (2006.01)

(52) U.S. Cl.
CPC ...... *G02B 6/02042* (2013.01); *G02B 6/03627* (2013.01)

(58) Field of Classification Search
CPC ........................ G02B 6/02042; G02B 6/03627
See application file for complete search history.

(56) References Cited

U.S. PATENT DOCUMENTS 4,134,642 A * 1/1979 Kapron ................ G02B 6/4469
385/127
4,295,739 A * 10/1981 Meltz .................... G01L 11/025
374/161
(Continued)

FOREIGN PATENT DOCUMENTS

EP 3 276 384 A1 1/2018
JP 2011-209702 A 10/2011
(Continued)

OTHER PUBLICATIONS

Tamura et al, Low-Loss Uncoupled Two-Core Fiber for Power Efficient Practical Submarine Transmission, "OFC" 19, M1E. 5(2019) (Year: 2019).*
(Continued)

*Primary Examiner* — Ryan A Lepisto
(74) *Attorney, Agent, or Firm* — Faegre Drinker Biddle & Reath LLP

(57) ABSTRACT

A multi-core optical fiber includes: a pair of cores; and a cladding that covers both of the pair of cores. A diameter of the cladding is 124 μm or more and 126 μm or less. A distance between centers of the pair of cores is 46.5 μm or less. Cross talk between counter-propagating cores at a wavelength of 1550 nm is −30 dB/100 km or less.

6 Claims, 8 Drawing Sheets

(56) References Cited

U.S. PATENT DOCUMENTS

| | | | | |
|---|---|---|---|---|
| 6,078,716 | A * | 6/2000 | Huang | G02B 6/2746 |
| | | | | 385/47 |
| 6,611,648 | B2 * | 8/2003 | Kumar | C03B 37/01222 |
| | | | | 385/126 |
| 9,052,432 | B2 * | 6/2015 | Yao | G02B 6/02042 |
| 9,291,768 | B2 * | 3/2016 | Ishida | G02B 6/02042 |
| 9,574,911 | B2 * | 2/2017 | Hoover | G01N 21/636 |
| 9,891,377 | B2 * | 2/2018 | Saito | G02B 6/02042 |
| 10,031,283 | B2 * | 7/2018 | Nakanishi | G02B 6/02042 |
| 10,031,285 | B2 * | 7/2018 | Nakanishi | G02B 6/02214 |
| 11,256,026 | B2 * | 2/2022 | Hayashi | G02B 6/03633 |
| 11,415,743 | B2 * | 8/2022 | Li | G02B 6/03644 |
| 11,585,684 | B2 * | 2/2023 | Li | G01K 11/32 |
| 11,592,613 | B2 * | 2/2023 | Bennett | G02B 6/0288 |
| 11,733,449 | B2 * | 8/2023 | Bickham | G02B 6/02019 |
| | | | | 385/126 |
| 2011/0206331 | A1 | 8/2011 | Imamura | |
| 2011/0222828 | A1 | 9/2011 | Sasaoka et al. | |
| 2013/0016949 | A1 | 1/2013 | Yao et al. | |
| 2013/0271771 | A1 * | 10/2013 | Sasaoka | G02B 6/26 |
| | | | | 356/477 |
| 2016/0209583 | A1 | 7/2016 | Hayashi et al. | |
| 2017/0351022 | A1 | 12/2017 | Nakanishi et al. | |
| 2018/0282200 | A1 * | 10/2018 | Nakanishi | C03B 37/044 |
| 2019/0049658 | A1 | 2/2019 | Saito et al. | |
| 2021/0063208 | A1 * | 3/2021 | Li | G01L 1/242 |
| 2021/0181408 | A1 * | 6/2021 | Bickham | G02B 6/03627 |

FOREIGN PATENT DOCUMENTS

| | | | |
|---|---|---|---|
| JP | 2011-215556 | A | 10/2011 |
| JP | 2012-514772 | A | 6/2012 |
| JP | 2013-020074 | A | 1/2013 |
| JP | 2017-181730 | A | 10/2017 |
| JP | 2020-086054 | A | 6/2020 |
| JP | 6715372 | B1 | 7/2020 |
| WO | 2010/080952 | A1 | 7/2010 |
| WO | 2010/119930 | A1 | 10/2010 |
| WO | WO-2016/152507 | A1 | 9/2016 |

OTHER PUBLICATIONS

Tamuraetal,Low-Loss UncoupledTwo-CoreFiberfor Power EfficientPracticalSubmarineTransmission, "OFC" 19, M1E. 5(2019)(Year:2019) (Year: 2019).*

Ranjan Rakesh et al., "Design strategies for two-core uncoupled multicore fiber for crosstalk analysis," Oct. 26, 2018, p. 1-p. 5, XP033555833.

Geng, Ying et al., "High-speed, bi-directional dual-core fiber transmission system for high-density, short-reach optical interconnects," Proc. of SPIE, vol. 9390, pp. 939009-1-10 (2015).

Sano, Akihide et al., "Crosstalk-Managed High Capacity Long Haul Multicore Fiber Transmission With Propagation-Direction Interleaving," Journal of Lightwave Technology, Apr. 28, 2014, vol. 32, No. 16, pp. 2771-2779.

Tamura, Yoshiaki et al., "Low-Loss Uncoupled Two-Core Fiber for Power Efficient Practical Submarine Transmission," OFC' 19, M1E.5 (2019).

* cited by examiner

MULTICORE OPTICAL FIBER AND OPTICAL TRANSMISSION SYSTEM

TECHNICAL FIELD

This application claims priority based on Japanese Patent Application No. 2020/159586 filed on Sep. 24, 2020, the entire contents of which are incorporated herein by reference.

The present disclosure relates to a multi-core optical fiber and an optical transmission system.

BACKGROUND ART

An uncoupled multi-core optical fiber having a pair of cores and a cladding is known (for example, Non-Patent Literature 1 and Non-Patent Literature 2). In such a multi-core optical fiber, since an independent optical signal can be propagated in each core, the transmission capacity per fiber is larger than that of a single-core optical fiber having a single core.

CITATION LIST

Non-Patent Literature

[Non-Patent Literature 1] Geng, "High-speed, bi-directional dual-core fiber transmission system for high-density, short-reach optical interconnects", Proc. of SPIE, vol. 9390, pp. 939009-1-10 (2015).
[Non-Patent Literature 2] Tamura, "Low-Loss Uncoupled Two-Core Fiber for Power Efficient Practical Submarine Transmission", OFC' 19, M1E. 5 (2019).

SUMMARY OF INVENTION

A multi-core optical fiber according to the present disclosure includes: a pair of cores; and a cladding that covers both of the pair of cores. A diameter of the cladding is 124 μm or more and 126 μm or less. A distance between centers of the pair of cores is 46.5 μm or less. Cross talk between counter-propagating cores at a wavelength of 1550 nm is −30 dB/100 km or less. The centers of the pair of cores may be arranged on the same circle centered on the fiber axis and on one straight line passing through the fiber axis in a cross section perpendicular to the fiber axis.

An optical transmission system according to an embodiment of the present disclosure includes: the multi-core optical fiber; and an optical transmitter and an optical receiver connected to both ends of each of the pair of cores.

DESCRIPTION OF EMBODIMENTS

Figure 1:
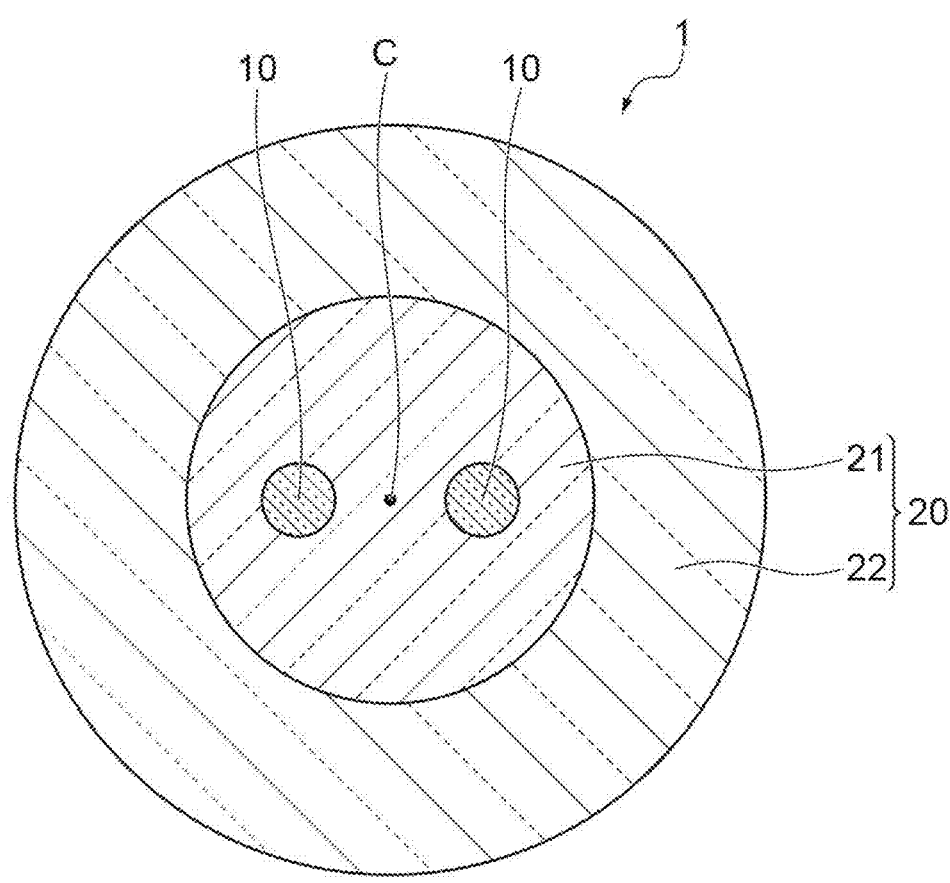
FIG. 1 is a diagram showing a cross-sectional configuration of a multi-core optical fiber according to an embodiment.

Problems to be Solved by the Present Disclosure

In the multi-core optical fiber, it is necessary to increase an inter-core distance (that is, pitch between cores, core interval) which is a distance between centers of a pair of cores in order to reduce crosstalk between signals propagating through the cores. In above Non-Patent Literature 1 and Non-Patent Literature 2, a large inter-core distance of 46.6 μm or more is ensured. However, when the inter-core distance increases, the distance between the fiber center and the core center increases, and thus connection loss due to angular deviation increases when multi-core optical fibers are connected to each other.

An object of the present disclosure is to provide a multi-core optical fiber and an optical transmission system capable of suppressing crosstalk during actual use to a low level and suppressing an increase in connection loss.

Effects of the Present Disclosure

According to the present disclosure, it is possible to provide a multi-core optical fiber and an optical transmission system capable of suppressing cross talk between counter-propagating cores to be low and suppressing an increase in connection loss.

Description of Embodiments of the Present Disclosure

First, embodiments of the present disclosure are listed and described. A multi-core optical fiber according to an embodiment of the present disclosure includes: a pair of cores; and a cladding that covers both of the pair of cores. A diameter of the cladding is 124 μm or more and 126 μm or less. A distance between centers of the pair of cores is 46.5 μm or less. Cross talk between counter-propagating cores at a wavelength of 1550 nm is −30 dB/100 km or less. Here, light that has been incident into one end of one core of a pair of cores is emitted from the other end of one core of the pair of cores, some of which returns to the one end of the other core of the pair of cores, and the "cross talk between counter propagating cores" is a logarithm of a ratio of intensity of light returning to the one end of the other core to the intensity of light emitted from the other end of the one core. The centers of the pair of cores may be arranged on the same circle centered on the fiber axis and on one straight line passing through the fiber axis in the cross section perpendicular to the fiber axis.

In this multi-core optical fiber, the distance from the gravity center of each core to the fiber axis is small. Therefore, an increase in connection loss due to an angular deviation can be suppressed in a case where two multi-core optical fibers are ideally arranged so that the gravity centers of the cores coincide with each other when they are connected.

The bending loss at a wavelength of 1625 nm when the multi-core optical fiber is wound in an annular shape with a radius of 30 mm may be 0.25 dB/100 turns or less, and the cable cut-off wavelength defined in ITU-T G. 650. 1 may be 1530 nm or less. In this case, it can be interconnected with widely used optical fibers conforming to ITU-T G. 654A to D.

The cladding may include: an optical cladding covering the pair of cores; and a physical cladding surrounding the optical cladding and having a refractive index greater than or equal to a refractive index of the optical cladding. In this case, since a refractive index step is introduced at the interface between the optical cladding and the physical cladding, the inter-core distance can be further reduced. In addition, design tolerance of bending loss and cable cut-off wavelength may be increased.

A relative refractive index difference of the physical cladding with respect to the optical cladding may be 0.1% or more 0.4% or less. In this case, the inter-core distance can be reliably reduced. In addition, it is possible to reliably increase design tolerances of bending loss and cable cut-off wavelength.

The multi-core optical fiber may further include a low refractive index portion disposed between the pair of cores and having a refractive index lower than a refractive index of the optical cladding. In this case, the inter-core distance can be further reduced. Therefore, it is possible to further suppress an increase in connection loss due to the angular deviation.

An optical transmission system according to an embodiment of the present disclosure includes: the multi-core optical fiber; and an optical transmitter and an optical receiver connected to both ends of each of the pair of cores.

Since the optical transmission system includes the multi-core optical fiber, it is possible to suppress an increase in connection loss while reducing crosstalk.

Detailed Description of Embodiments of the
Present Disclosure

Specific examples of a multi-core optical fiber and an optical transmission system according to the present disclosure will be described below with reference to the drawings. It should be noted that the present invention is not limited to these examples but is defined by the scope of claims and is intended to include all modifications within the meaning and scope equivalent to the scope of claims. In the description of the drawings, the same elements are denoted by the same reference numerals, and redundant description will be omitted.

FIG. 1 is a diagram showing a cross-sectional configuration of a multi-core optical fiber according to an embodiment. As shown in FIG. 1, an MCF 1 includes a pair of cores 10 and a cladding 20. The MCF 1 may further include a resin coating (not shown) covering the outer peripheral surface of the cladding 20. The MCF 1 is uncoupled.

The pair of cores 10 are arranged point-symmetrically with respect to the fiber axis C in a cross section perpendicular to the fiber axis C of the MCF 1. In the cross section perpendicular to the fiber axis C, the centers of the pair of cores 10 are arranged on the same circle centered on the fiber axis C and on one straight line passing through the fiber axis C. A distance between the centers of the pair of cores 10 (that is, inter-core distance or core interval) is 46.5 μm or less. A diameter of each core 10 (that is, core diameter) is, for example, 8 μm or more and 14 μm or less. The core 10 is made of, for example, glass which contains quartz glass as a main component and to which an element for refractive index modulation is added as necessary. In the present embodiment, the pair of cores 10 are equal to each other in any of the diameter (shape), material, additive element, and refractive index distribution.

The pair of cores 10 may be, for example, a combination of a core containing an alkali metal element such as a potassium element, a sodium element, or a rubidium element and a core 10 not containing an alkali metal element. The pair of cores 10 may be, for example, a combination of a core 10 having a central depressed including a central axis of the core 10 and a core 10 having no central depressed.

The cladding 20 is provided around the pair of cores 10 and covers both of the pair of cores 10. The cladding 20 has a radius of 124 μm or more and 126 μm or less. The cladding 20 includes an optical cladding 21 and a physical cladding 22. The optical cladding 21 and the physical cladding 22 are made of, for example, glass which contains quartz glass as a main component and to which an element for refractive index modulation is added as necessary.

The optical cladding 21 covers both of the pair of cores 10. The optical cladding 21 is provided around the pair of cores 10 and between the pair of cores 10. The optical cladding 21 covers the entire outer peripheral surface of each core 10. The optical cladding 21 is in contact with the outer peripheral surface of each core 10. The diameter of the optical cladding 21 (optical cladding diameter) is, for example, 58 μm or more and 80 μm or less.

The physical cladding 22 is provided around the optical cladding 21 and surrounds the optical cladding 21. The physical cladding 22 covers the optical cladding 21. The physical cladding 22 is in contact with the outer peripheral surface of the optical cladding 21. The diameter of the physical cladding 22 corresponds to the diameter of the cladding 20.

The refractive index of the cladding 20 is lower than that of the core 10. The refractive index of the optical cladding 21 and the refractive index of the physical cladding 22 are each lower than that of the core 10. The relative refractive index difference of the core 10 with respect to the optical cladding 21 is, for example, 0.30% or more 0.60% or less. The refractive index of the physical cladding 22 is greater than or equal to the refractive index of the optical cladding 21. That is, the refractive index of the optical cladding 21 is the same as or lower than the refractive index of the physical cladding 22. The relative refractive index difference of the physical cladding 22 with respect to the optical cladding 21 is, for example, 0.1% or more 0.4% or less.

The relative refractive index difference of the core 10 with respect to pure quartz is, for example, −0.10% or more 0.20% or less. The relative refractive index difference of the optical cladding 21 with respect to pure quartz is, for example, −0.50% or more −0.20% or less. The relative refractive index difference of the physical cladding 22 with respect to pure quartz is, for example, −0.30% or more −0.10% or less.

Figure 2:
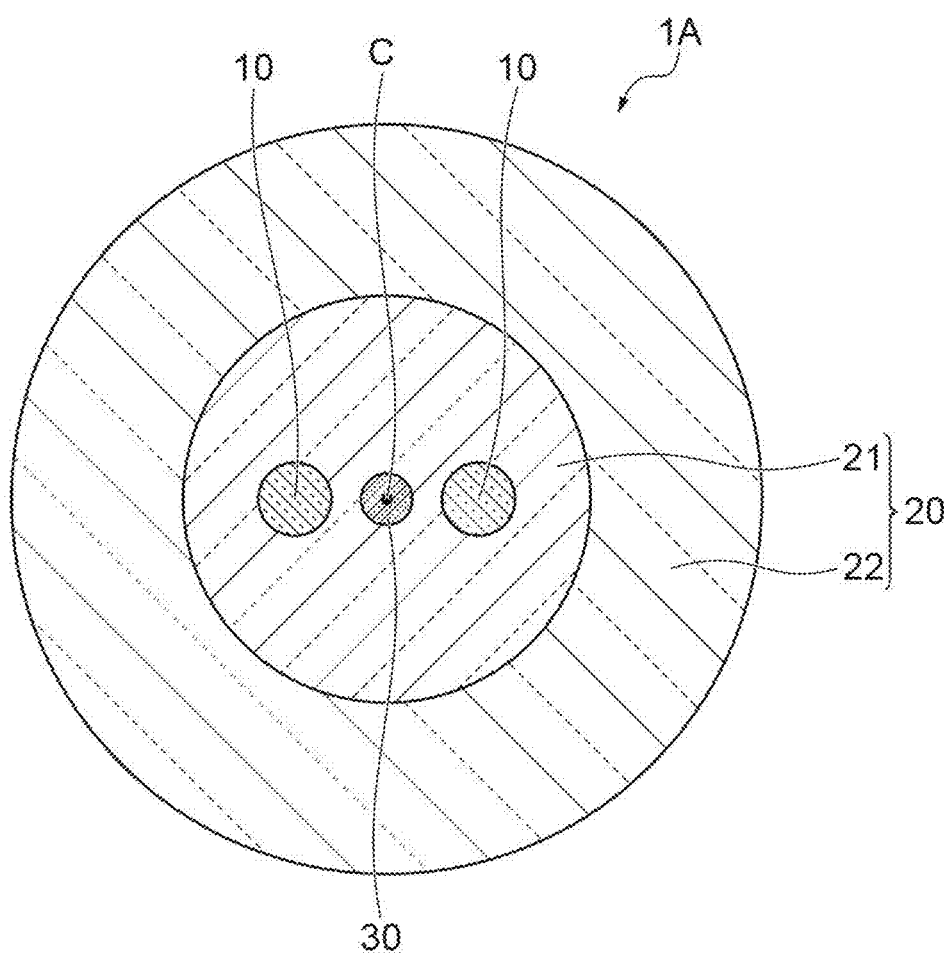
FIG. 2 is a diagram showing a cross-sectional configuration of a multi-core optical fiber according to a modified embodiment.

FIG. 2 is a diagram showing a cross-sectional configuration of the multi-core optical fiber according to a modified embodiment. As shown in FIG. 2, an MCF 1A differs from the MCF 1 (see FIG. 1) in that it further includes a low refractive index portion 30, and is otherwise identical. The low refractive index portion 30 is disposed between the pair of cores 10 so as to overlap the fiber axis C. In a cross section perpendicular to the fiber axis C, the center of the low refractive index portion 30 coincides with the fiber axis C. The low refractive index portion 30 is spaced apart from the pair of cores 10.

The low refractive index portion 30 has a refractive index lower than the refractive index of the optical cladding 21. The relative refractive index difference of the low refractive index portion 30 with respect to the optical cladding 21 is, for example, −0.30% or more −0.10% or less. The low refractive index portion 30 is made of, for example, glass which contains quartz glass as a main component and to which an element for refractive index modulation is added as necessary. For example, fluorine (F) is added to the low refractive index portion 30 as the element for refractive index modulation. The diameter of the low refractive index portion 30 is, for example, 0.5 times or more 1.0 time or less of the core diameter.

In the MCFs 1 and 1A, a bending loss at a wavelength of 1625 nm when wound in an annular shape with a radius of 30 mm is 0.25 dB/100 turns or less. Cable cut-off wavelength $\lambda$cc is 1530 nm or less. In the MCFs 1 and 1A, the effective area Aeff of light propagating through each core 10 is, for example, 70 $\mu$m$^2$ or more and 130 $\mu$m$^2$ or less.

In the MCFs 1 and 1A, the pair of cores 10 may propagate the pair of signal lights in the reverse direction or in the same direction. A part of incident light incident on the core 10 as signal light leaks to the adjacent core 10. A ratio of the intensity of light leaked from the adjacent core 10 with respect to the intensity of light emitted from the core 10 on which incident light is incident is referred to as inter-core crosstalk. The inter-core crosstalk (cross talk between counter-propagating cores) related to the intensity of light leaking from the adjacent core 10 at the incident end at the wavelength of 1550 nm is, for example, −30 dB/100 km or less. In other words, when the incident light intensity is 1, the intensity of the leaked light is $1/1000$ or less. The inter-core crosstalk (cross talk between parallel-propagating cores) related to the intensity of light leaking from the adjacent core 10 at the emission end at the wavelength of 1550 nm is, for example, −10 dB/100 km or less.

In the case of propagation in the reverse direction, inter-core crosstalk may be suppressed compared to the case of propagation in the same direction. In the case of propagation in the reverse direction, the inter-core distance required to secure the same level of inter-core crosstalk as in the case of propagation in the same direction may be reduced. Therefore, in the case of propagation in the reverse direction, it is possible to reduce the connection loss due to the angular deviation more than in the case of propagation in the same direction.

In the MCFs 1 and 1A, the optical cladding 21 and the physical cladding 22 have different refractive indexes, but the optical cladding 21 and the physical cladding 22 may have the same refractive index. That is, the cladding 20 may have a uniform refractive index.

Figure 3:
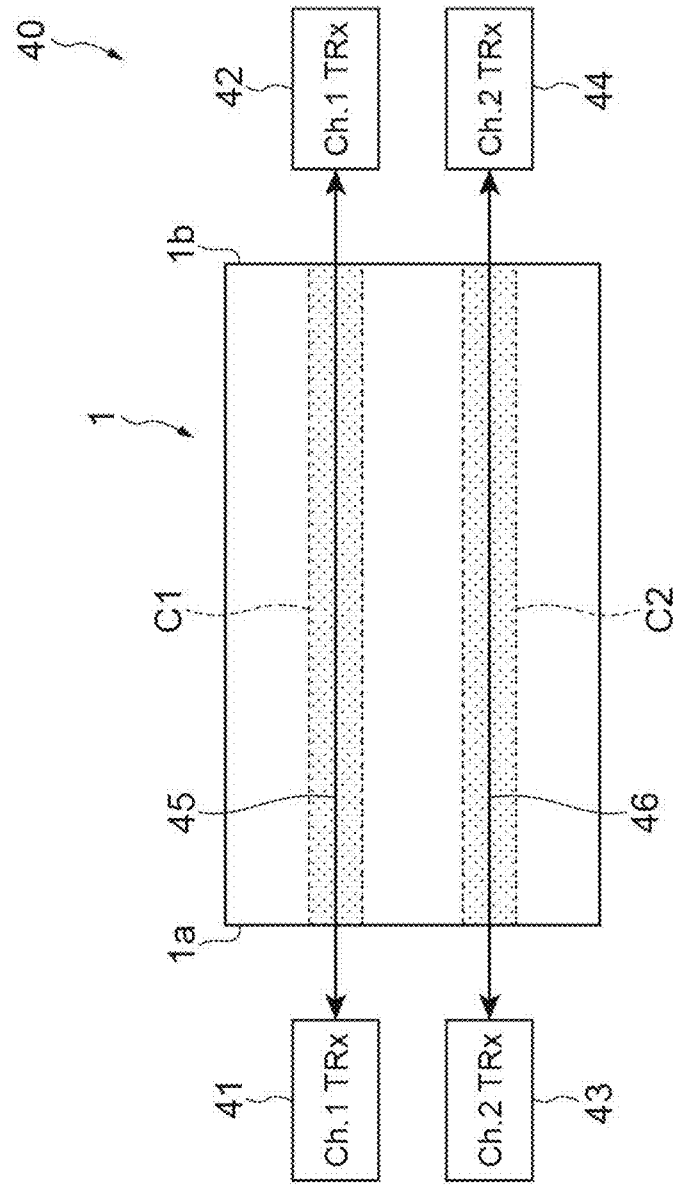
FIG. 3 is a diagram showing a configuration of an optical transmission system according to an embodiment.

FIG. 3 is a diagram showing a configuration of an optical transmission system according to an embodiment. As shown in FIG. 3, the optical transmission system 40 includes the MCF 1 and four optical transceivers (TRx) 41, 42, 43, and 44. One of the pair of cores 10 of the MCF 1 constitutes a transfer path C1, and the other constitutes a transfer path C2. The optical transceivers 41 and 42 are connected to both ends of the transfer path C1 (core 10). The optical transceivers 43 and 44 are connected to both ends of the transfer path C2 (core 10). The optical transceivers 41 and 43 are connected to a fiber end 1a of the MCF 1. The optical transceivers 42 and 44 are connected to a fiber end 1b of the MCF 1.

The transfer path C1 transfers signal light 45, and the transfer path C2 transfers signal light 46. In the optical transmission system 40, the transfer path C1 bidirectionally transfers the signal light 45, and the transfer path C2 bidirectionally transfers the signal light 46. That is, one of the optical transceivers 41 and 42 transfers the signal light 45, and the other receives the signal light 45. One of the optical transceivers 43 and 44 transfers the signal light 46 and the other receives the signal light 46.

In the optical transmission system 40, the transfer path C1 may transfer the signal light 45 only in one direction. In this case, the optical transmission system 40 may include an optical transmitter and an optical receiver instead of the pair of optical transceivers 41 and 42. Further, the optical transmission system 40 may be configured such that the transfer path C2 transfers the signal light 46 only in one direction. In this case, the optical transmission system 40 may include an optical transmitter and an optical receiver instead of the pair of optical transceivers 43 and 44. The optical transmission system 40 may include the MCF 1A instead of the MCF 1.

Figure 4:
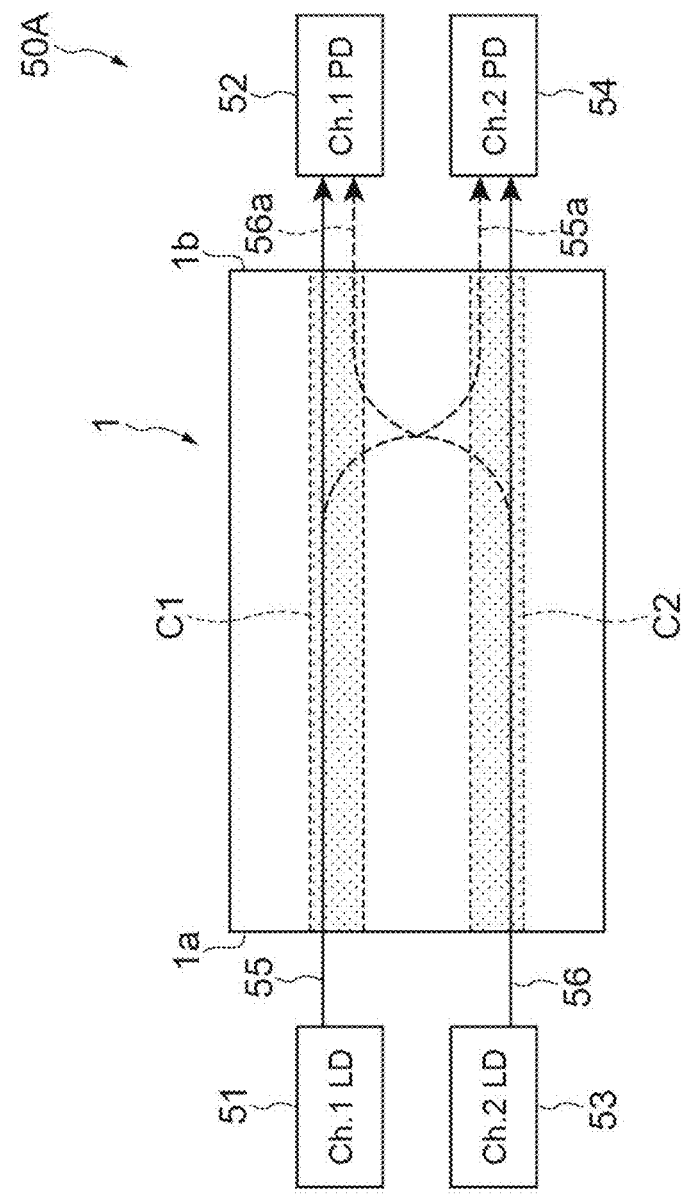
FIG. 4 is a diagram showing a configuration of a measurement system for cross talk between parallel-propagating cores.
Figure 5:
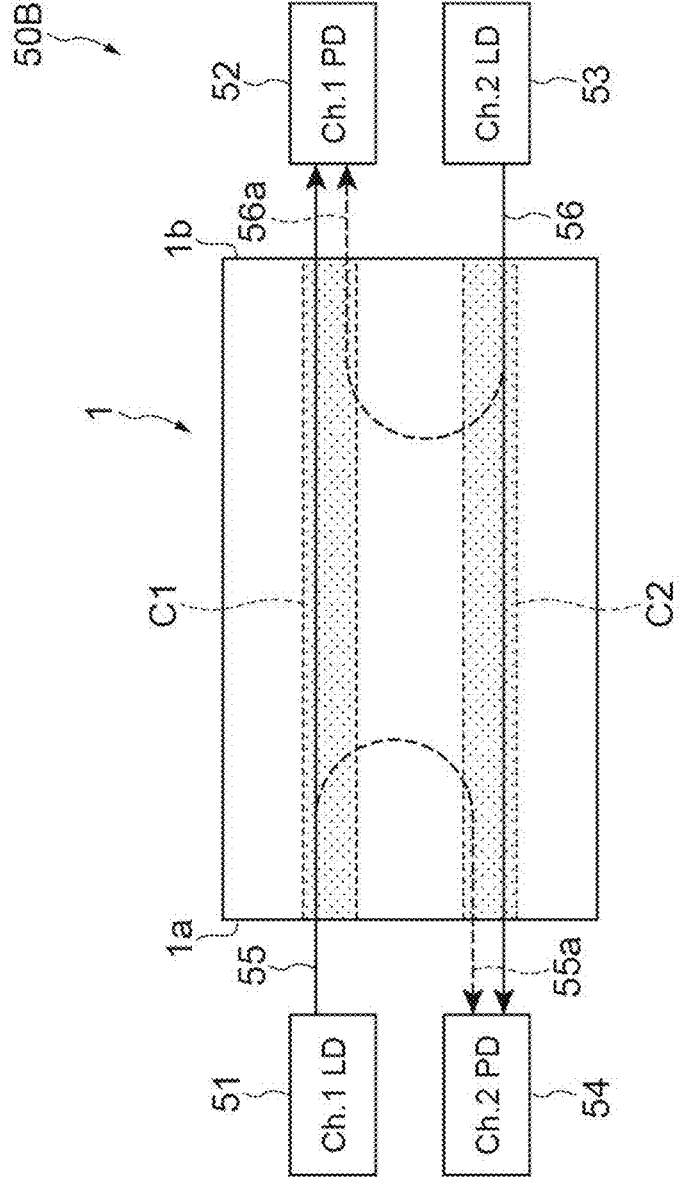
FIG. 5 is a diagram showing a configuration of a measurement system for cross talk between counter-propagating cores.

FIGS. 4 and 5 are diagrams showing configurations of measurement systems of cross talk between parallel-propagating cores and cross talk between counter-propagating cores, respectively.

As shown in FIG. 4, in the measurement system 50A, an optical transmitter 51 is provided in the fiber end 1a of the transfer path C1. An optical receiver 52 is provided in the fiber end 1b of the transfer path C1. An optical transmitter 53 is provided in the fiber end 1a of the transfer path C2. An optical receiver 54 is provided in the fiber end 1b of the transfer path C2.

The optical transmitters 51 and 53 are, for example, laser diodes. The optical receivers 52 and 54 are, for example, photodiodes. The optical transmitter 51 causes laser light as incident light 55 to enter the transfer path C1 from the fiber end 1a. The optical receiver 52 measures the intensity of light emitted from the transfer path C1 in the fiber end 1b. The optical transmitter 53 causes laser light as incident light 56 to enter the transfer path C2 from the fiber end 1a. The optical receiver 54 measures the intensity of light emitted from the transfer path C2 in the fiber end 1b.

In the measurement of cross talk between parallel-propagating cores by the measurement system 50A, incident light 55 enters the transfer path C1 from the fiber end 1a using the optical transmitter 51, the intensity 51-52 of light output from the transfer path C1 is measured using the optical receiver 52, and the intensity $I_{51\text{-}54}$ of light 55a leaked to the adjacent transfer path C2 is measured using the optical receiver 54. Also, incident light 56 enters the transfer path C2 from the fiber end 1a using the optical transmitter 53, the intensity 153-54 of light output from the transfer path C2 is measured using the optical receiver 54, and the intensity $I_{53\text{-}52}$ of light 56a leaked to the adjacent transfer path C1 is measured by using the optical receiver 52. The logarithm log $(I_{51\text{-}54}/I_{51\text{-}52})$ of the ratio of the intensity $I_{51\text{-}54}$ with respect to the intensity $I_{51\text{-}52}$ and the logarithm log $(I_{53\text{-}52}/I_{53\text{-}54})$ of the ratio of the intensity $I_{53\text{-}52}$ with respect to the intensity $I_{53\text{-}54}$ are cross talk between parallel-propagating cores. The values of the two ratios are theoretically identical.

As shown in FIG. 5, the measurement system 50B is different from the measurement system 50A in that the arrangement of the optical transmitter 53 and the optical receiver 54 is switched. That is, in the measurement system 50B, the optical transmitter 53 causes laser light as incident light 56 to enter the transfer path C2 from the fiber end 1*b*. The optical receiver 54 measures the intensity of light emitted from the transfer path C2 in the fiber end 1*a*.

In the measurement of cross talk between counter-propagating cores by the measurement system 50B, incident light 55 enters the transfer path C1 from the fiber end 1*a* using the optical transmitter 51, the intensity $I_{51-52}$ of light output from the transfer path C1 is measured using the optical receiver 52, and the intensity $I_{51-54}$ of light 55*a* returned to the adjacent waveguide is measured using the optical receiver 54. Also, incident light 56 enters the transfer path C1 from the fiber end 1*b* using the optical transmitter 53, the intensity $I_{52-54}$ of light output from the transfer path C1 is measured by using the optical receiver 54, and the intensity $I_{53-52}$ of light 56*a* returned to the adjacent waveguide is measured by using the optical receiver 52. The logarithm log $(I_{51-54}/I_{51-52})$ of the ratio of the intensity $I_{51-54}$ with respect to the intensity $I_{51-52}$ and the logarithm log $(I_{53-52}/I_{53-54})$ of the ratio of the intensity $I_{53-52}$ with respect to the intensity $I_{53-54}$ are cross talks between counter-propagating cores. The values of the two ratios are theoretically identical.

Figure 6:
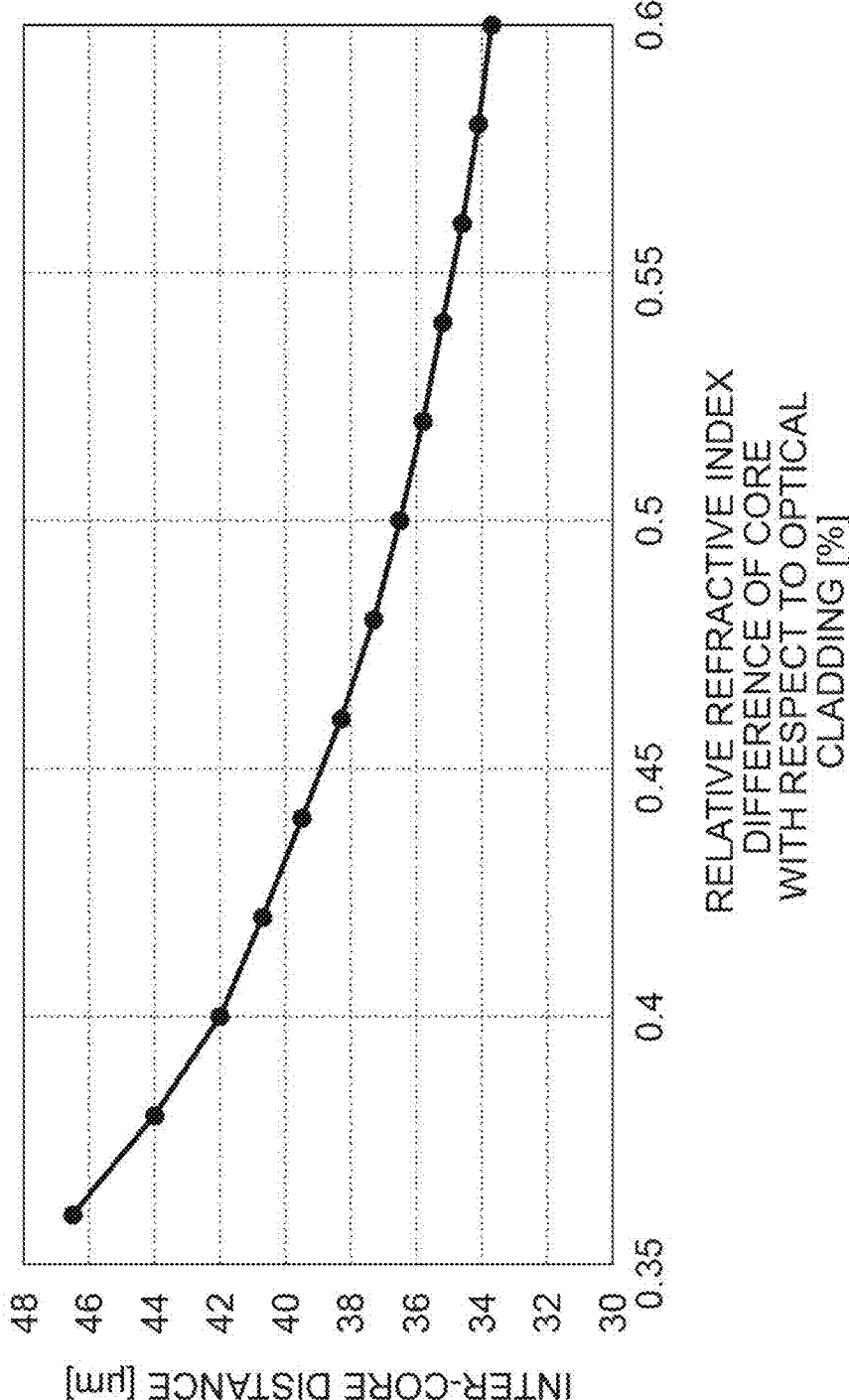
FIG. 6 is a calculation example of a condition in which the cross talk between counter-propagating cores at a wavelength of 1550 nm becomes −30 dB/100 km when an effective area is 80 μm².

FIG. 6 is a calculation example of a condition in which the cross talk between counter-propagating cores at a wavelength of 1550 nm becomes −30 dB/100 km when an effective area is 80 $\mu m^2$. FIG. 6 is a calculation example for a configuration that does not have a low refractive index portion, that is, a configuration corresponding to the MCF 1. The graph shown in FIG. 6 shows the relationship between the relative refractive index difference (%) of the core with respect to the optical cladding and the inter-core distance ($\mu m$) at which the cross talk between counter-propagating cores at a wavelength of 1550 nm becomes −30 dB/100 km when the effective area is 80 $\mu m^2$. The horizontal axis indicates the relative refractive index difference (%) of the core with respect to optical cladding. The vertical axis indicates the inter-core distance ($\mu m$).

As shown in FIG. 6, as the relative refractive index difference of the core with respect to the optical cladding increases, it is possible to reduce the inter-core distance. When the effective area of light propagating through the core is 80 $\mu m^2$, the relative refractive index difference of the core with respect to the optical cladding needs to be 0.36% or more in order to reduce the inter-core distance to 46.5 $\mu m$ or less while suppressing the cross talk between counter-propagating cores at a wavelength of 1550 nm to −30 dB/100 km. More preferably, the relative refractive index difference of the core with respect to the optical cladding is 0.42% or more. Accordingly, it is possible to reduce the inter-core distance to 41 $\mu m$ or less, and the connection loss can be stably suppressed to a low level. More preferably, the relative refractive index difference of core with respect to optical cladding is 0.48% or more. Accordingly, it is possible to reduce the inter-core distance to 38 $\mu am$ or less, and the connection loss can be stably suppressed to a low level. On the other hand, the relative refractive index difference of core with respect to the optical cladding is preferably 0.60% or less. As a result, it is possible to suppress an increase in transmission loss caused by an additive added to increase the relative refractive index difference, and suppress an increase in polarization mode dispersion caused by asymmetry that may occur during manufacturing.

Figure 7:
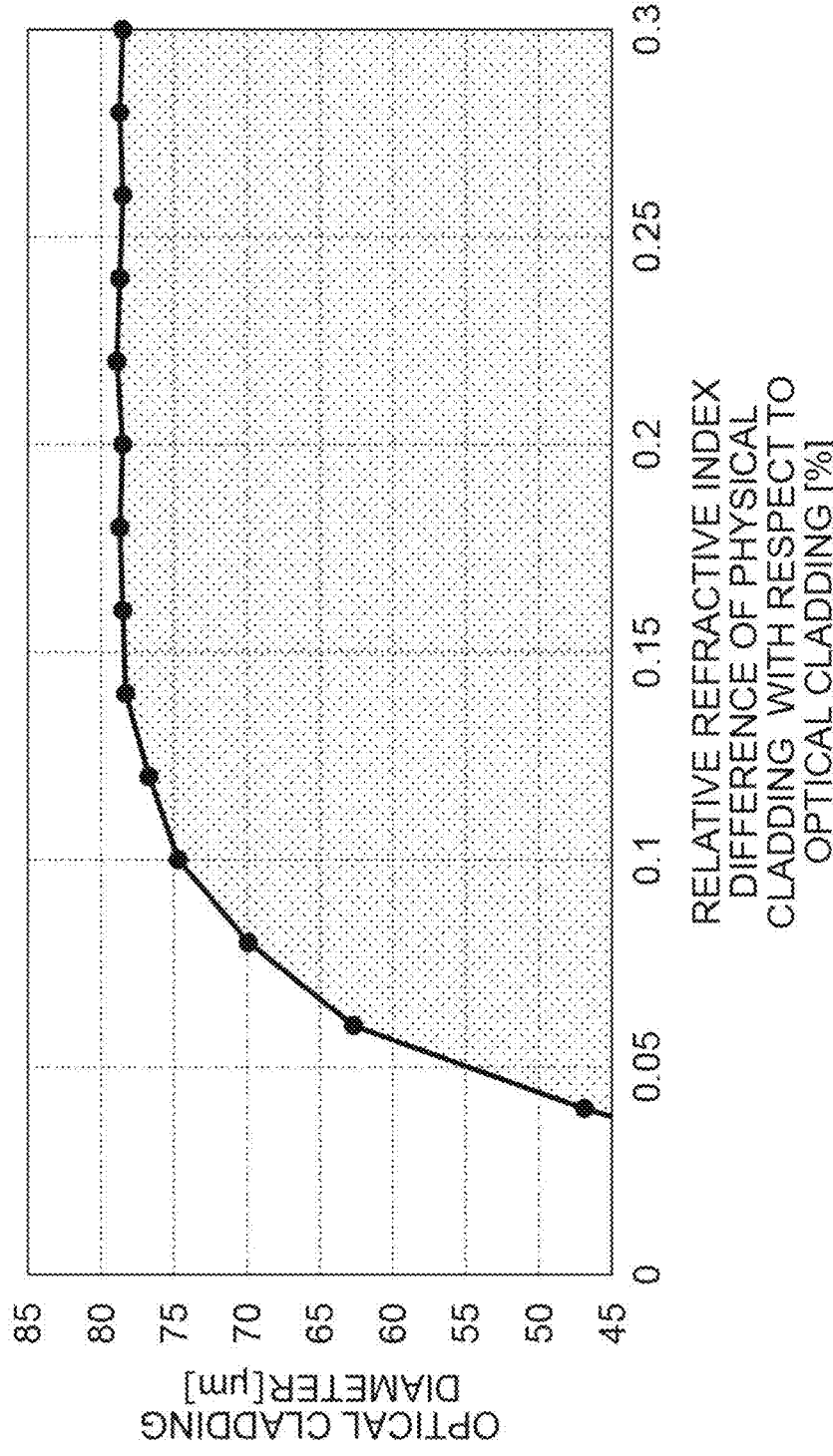
FIG. 7 is a graph showing a calculation example of a region in which a cable cut-off wavelength is 1470 nm or less in a case where the relative refractive index difference of a core with respect to an optical cladding is 0.50% and an inter-core distance is 36.5 μm.

FIG. 7 is a graph showing a calculation example of a region in which a cable cut-off wavelength is 1470 nm or less in a case where the relative refractive index difference of the core with respect to the optical cladding is 0.50% and the inter-core distance is 36.5 $\mu m$. FIG. 7 is a calculation example for a configuration having no low refractive index portion, that is, a configuration corresponding to the MCF 1. The graph shown in FIG. 7 shows the relationship between the relative refractive index difference (%) of the physical cladding with respect to the optical cladding and the optical cladding diameter ($\mu m$) at which the cable cut-off wavelength becomes 1470 nm when the relative refractive index difference of the core with respect to the optical cladding is 0.50% and the inter-core distance is 36.5 $\mu m$. The horizontal axis is the relative refractive index difference (%) of the physical cladding to the optical cladding. The vertical axis is an optical cladding diameter ($\mu m$) in which the cable cut-off wavelength becomes the 1470 nm when the relative refractive index difference of the core with respect to the optical cladding is 0.50% and the inter-core distance is 36.5 $\mu m$.

By manufacturing the structure in the range shown in FIG. 7 as a design center, it is possible to stably suppress the cable cut-off wavelength to 1530 nm or less even when there is a manufacturing variation that may normally occur. As a result, it is possible to interconnect with optical fibers conforming to the widely used ITU-T G. 654.

Figure 8:
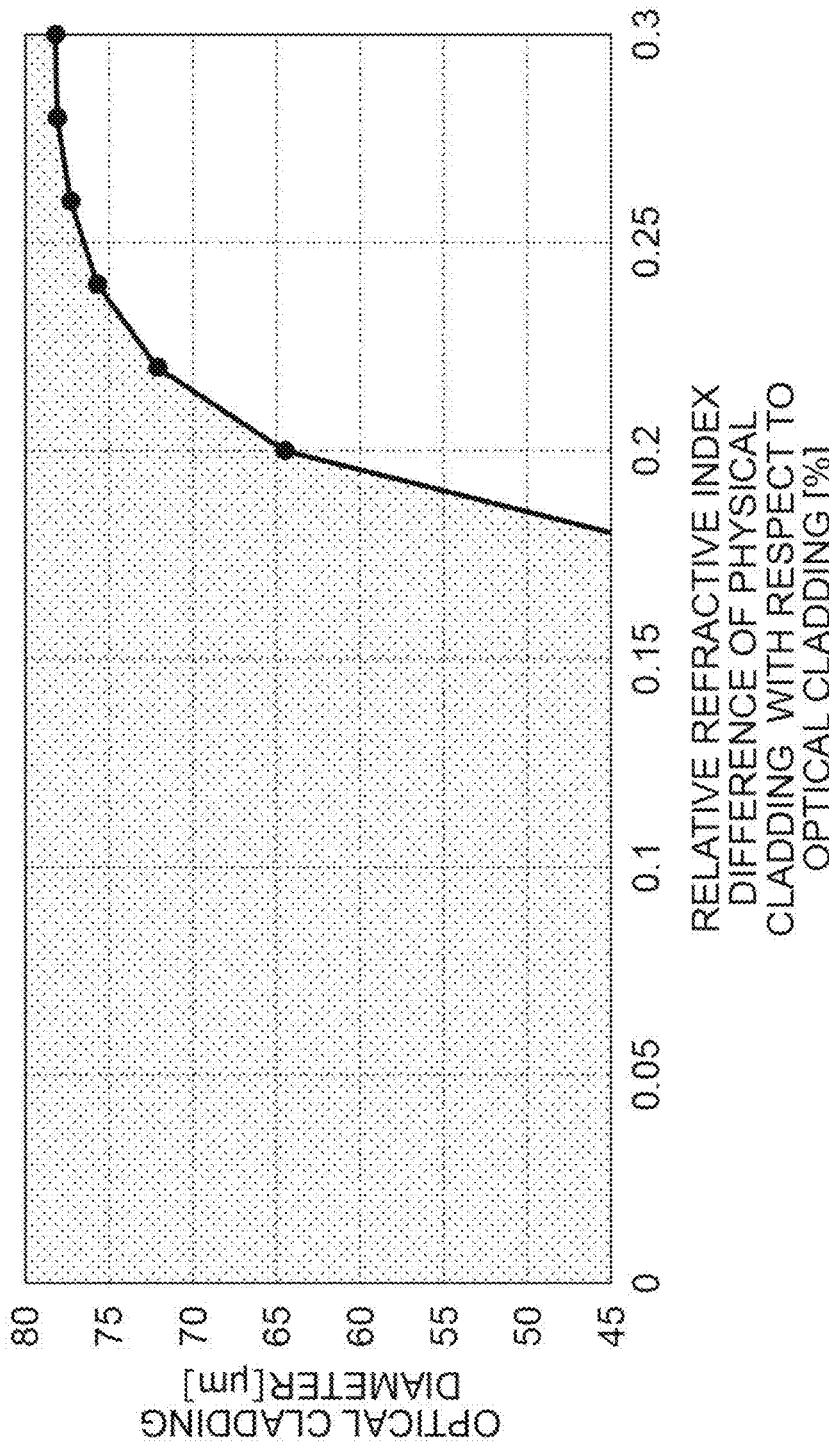
FIG. 8 is a calculation example of a region in which a bending loss at a wavelength of 1625 nm when a multi-core optical fiber is wound in an annular shape with a radius of 30 mm is 0.25 dB/100 turns or less in a case where a relative refractive index difference of a core with respect to an optical cladding is 0.50% and an inter-core distance is 36.5 μm.

FIG. 8 is a calculation example of a region in which a bending loss at a wavelength of 1625 nm when the MCF is wound in an annular shape with a radius of 30 mm is 0.25 dB/100 turns or less in a case where the relative refractive index difference of the core with respect to the optical cladding is 0.50% and the inter-core distance is 36.5 $\mu m$. FIG. 8 is a calculation example for a configuration having no low refractive index portion, that is, a configuration corresponding to the MCF 1. The graph shown in FIG. 8 shows the relationship between the relative refractive index difference (%) of the physical cladding with respect to the optical cladding and the optical cladding diameter ($\mu m$) in which the bending loss at a wavelength of 1625 nm when the MCF is wound in an annular shape with a radius of 30 mm is 25 dB/100 turns. The horizontal axis is the relative refractive index difference (%) of the physical cladding with respect to the optical cladding. The vertical axis is the optical cladding diameter ($\mu m$) at which the bending loss at a wavelength of 1625 nm when the MCF is wound in an annular shape with a radius of 30 mm is 0.25 dB/100 turns.

By manufacturing the structure in the range shown in FIG. 8 as a design center, the bending loss in the bending radius of 30 mm at the wavelength of 1625 nm can be stably suppressed to 0.50 dB/100 turns or less even when where there is a manufacturing variation that may normally occur. As a result, the cable cut-off wavelength can be stably suppressed to 1530 nm or less. As a result, it is possible to interconnect with optical fibers conforming to widely used ITU-T G. 654A to D.

Tables 1 to 4 show calculation examples related to optical characteristics of the MCF 1. Table 1 shows calculation examples 1-1 to 1-16. Table 2 shows calculation examples 2-1 to 2-16. Table 3 shows calculation examples 3-1 to 3-16. Table 4 shows calculation examples 4-1 to 4-16. In Tables 1 to 4, core diameter ($\mu m$), relative refractive index difference of core with respect to pure quartz (%), inter-core distance ($\mu m$), optical cladding diameter ($\mu m$), relative refractive index difference of optical cladding with respect to pure quartz (%), relative refractive index difference of physical cladding with respect to pure quartz (%), diameter of low refractive index portion ($\mu m$), cross talk XT between counter-propagating cores at wavelength of 1550 nm (dB/100 km), bending loss at a wavelength of 1625 nm when the MCF is wound in an annular shape with a radius of 30 mm (dB/100 turns), and cable cut-off wavelength $\lambda cc$ (nm).

TABLE 1

| No | Core diameter [μm] | Relative refractive index difference of core [%] | Inter-core distance [μm] | Optical cladding diameter [μm] | Relative refractive index difference of optical cladding [%] |
|---|---|---|---|---|---|
| 1-1 | 10.38 | 0.09 | 33.6 | 68.8 | −0.47 |
| 1-2 | 10.38 | 0.09 | 35.9 | 71.4 | −0.47 |
| 1-3 | 10.38 | 0.09 | 36.2 | 77.2 | −0.47 |
| 1-4 | 10.38 | 0.09 | 42 | 35.2 | −0.47 |
| 1-5 | 10.38 | 0.09 | 32.8 | 68 | −0.47 |
| 1-6 | 10.38 | 0.09 | 35.1 | 70.6 | −0.47 |
| 1-7 | 10.38 | 0.09 | 35.4 | 76.4 | −0.47 |
| 1-8 | 10.38 | 0.09 | 41.2 | 82.5 | −0.47 |
| 1-9 | 10.38 | 0.09 | 31.5 | 66.7 | −0.47 |
| 1-10 | 10.38 | 0.09 | 33.8 | 69.3 | −0.47 |
| 1-11 | 10.38 | 0.09 | 34.1 | 75.1 | −0.47 |
| 1-12 | 10.38 | 0.09 | 39.9 | 69 | −0.47 |
| 1-13 | 10.38 | 0.09 | 29.5 | 64.7 | −0.47 |
| 1-14 | 10.38 | 0.09 | 31.8 | 67.3 | −0.47 |
| 1-15 | 10.38 | 0.09 | 32.1 | 73.1 | −0.47 |
| 1-16 | 10.38 | 0.09 | 37.9 | 35.2 | −0.47 |

| No | Relative refractive index difference of physical cladding [%] | Diameter of low refractive index portion [μm] | XT [dB/100 km] | Bending loss [dB/100 t] | λcc [nm] |
|---|---|---|---|---|---|
| 1-1 | −0.29 | None | −34 | 0.2 | 1440 |
| 1-2 | −0.29 | None | −43 | 0.2 | 1440 |
| 1-3 | −0.29 | None | −32 | 0.2 | 1440 |
| 1-4 | −0.29 | None | −49 | 0.2 | 1440 |
| 1-5 | −0.29 | 5.19 | −34 | 0.2 | 1440 |
| 1-6 | −0.29 | 5.19 | −43 | 0.2 | 1440 |
| 1-7 | −0.29 | 5.19 | −32 | 0.2 | 1440 |
| 1-8 | −0.29 | 5.19 | −49 | 0.2 | 1440 |
| 1-9 | −0.29 | 10.38 | −34 | 0.2 | 1440 |
| 1-10 | −0.29 | 10.38 | −43 | 0.2 | 1440 |
| 1-11 | −0.29 | 10.38 | −32 | 0.2 | 1440 |
| 1-12 | −0.29 | 10.38 | −49 | 0.2 | 1440 |
| 1-13 | −0.29 | 15.57 | −34 | 0.2 | 1440 |
| 1-14 | −0.29 | 15.57 | −43 | 0.2 | 1440 |
| 1-15 | −0.29 | 15.57 | −32 | 0.2 | 1440 |
| 1-16 | −0.29 | 15.57 | −49 | 0.2 | 1440 |

TABLE 2

| No | Core diameter [μm] | Relative refractive index difference of core [%] | Inter-core distance [μm] | Optical cladding diameter [μm] | Relative refractive index difference of optical cladding [%] |
|---|---|---|---|---|---|
| 2-1 | 10.33 | 0.09 | 33.3 | 65.7 | −0.46 |
| 2-2 | 10.33 | 0.09 | 41.8 | 74.2 | −0.46 |
| 2-3 | 10.33 | 0.09 | 36.5 | 68.9 | −0.46 |
| 2-4 | 10.33 | 0.09 | 38.4 | 70.8 | −0.46 |
| 2-5 | 10.33 | 0.09 | 32.5 | 64.9 | −0.46 |
| 2-6 | 10.33 | 0.09 | 41 | 73.4 | −0.46 |
| 2-7 | 10.33 | 0.09 | 35.7 | 68.1 | −0.46 |
| 2-8 | 10.33 | 0.09 | 37.6 | 70 | −0.46 |
| 2-9 | 10.33 | 0.09 | 31.2 | 63.6 | −0.46 |
| 2-10 | 10.33 | 0.09 | 39.7 | 72.1 | −0.46 |
| 2-11 | 10.33 | 0.09 | 34.4 | 66.8 | −0.46 |
| 2-12 | 10.33 | 0.09 | 36.3 | 68.7 | −0.46 |
| 2-13 | 10.33 | 0.09 | 29.2 | 61.6 | −0.46 |
| 2-14 | 10.33 | 0.09 | 37.7 | 70.1 | −0.46 |
| 2-15 | 10.33 | 0.09 | 32.4 | 64.8 | −0.46 |
| 2-16 | 10.33 | 0.09 | 34.3 | 66.7 | −0.46 |

TABLE 2-continued

| No | Relative refractive index difference of physical cladding [%] | Diameter of low refractive index portion [μm] | XT [dB/100 km] | Bending loss [dB/100 t] | λcc [nm] |
|---|---|---|---|---|---|
| 2-1 | −0.235 | None | −31 | 0.22 | 1350 |
| 2-2 | −0.235 | None | −47 | 0.22 | 1350 |
| 2-3 | −0.235 | None | −45 | 0.22 | 1350 |
| 2-4 | −0.235 | None | −32 | 0.22 | 1350 |
| 2-5 | −0.235 | 5.17 | −31 | 0.22 | 1350 |
| 2-6 | −0.235 | 5.17 | −47 | 0.22 | 1350 |
| 2-7 | −0.235 | 5.17 | −45 | 0.22 | 1350 |
| 2-8 | −0.235 | 5.17 | −32 | 0.22 | 1350 |
| 2-9 | −0.235 | 10.33 | −31 | 0.22 | 1350 |
| 2-10 | −0.235 | 10.33 | −47 | 0.22 | 1350 |
| 2-11 | −0.235 | 10.33 | −45 | 0.22 | 1350 |
| 2-12 | −0.235 | 10.33 | −32 | 0.22 | 1350 |
| 2-13 | −0.235 | 15.5 | −31 | 0.22 | 1350 |
| 2-14 | −0.235 | 15.5 | −47 | 0.22 | 1350 |
| 2-15 | −0.235 | 15.5 | −45 | 0.22 | 1350 |
| 2-16 | −0.235 | 15.5 | −32 | 0.22 | 1350 |

TABLE 3

| No | Core diameter [μm] | Relative refractive index difference of core [%] | Inter-core distance [μm] | Optical cladding diameter [μm] | Relative refractive index difference of optical cladding [%] |
|---|---|---|---|---|---|
| 3-1 | 10.59 | 0.09 | 31.2 | 62 | −0.51 |
| 3-2 | 10.59 | 0.09 | 37.1 | 67.9 | −0.51 |
| 3-3 | 10.59 | 0.09 | 33.8 | 64.6 | −0.51 |
| 3-4 | 10.59 | 0.09 | 39 | 69.8 | −0.51 |
| 3-5 | 10.59 | 0.09 | 30.5 | 61.3 | −0.51 |
| 3-6 | 10.59 | 0.09 | 36.4 | 67.2 | −0.51 |
| 3-7 | 10.59 | 0.09 | 33.1 | 63.9 | −0.51 |
| 3-8 | 10.59 | 0.09 | 38.3 | 69.1 | −0.51 |
| 3-9 | 10.59 | 0.09 | 29.2 | 60 | −0.51 |
| 3-10 | 10.59 | 0.09 | 35.1 | 65.9 | −0.51 |
| 3-11 | 10.59 | 0.09 | 31.8 | 62.6 | −0.51 |
| 3-12 | 10.59 | 0.09 | 37 | 67.8 | −0.51 |
| 3-13 | 10.59 | 0.09 | 27.2 | 58 | −0.51 |
| 3-14 | 10.59 | 0.09 | 33.1 | 63.9 | −0.51 |
| 3-15 | 10.59 | 0.09 | 29.8 | 60.6 | −0.51 |
| 3-16 | 10.59 | 0.09 | 35 | 65.8 | −0.51 |

| No | Relative refractive index difference of physical cladding [%] | Diameter of low refractive index portion [μm] | XT [dB/100 km] | Bending loss [dB/100 t] | λcc [nm] |
|---|---|---|---|---|---|
| 3-1 | −0.18 | None | −29 | 0.25 | 1450 |
| 3-2 | −0.18 | None | −34 | 0.25 | 1450 |
| 3-3 | −0.18 | None | −42 | 0.25 | 1450 |
| 3-4 | −0.18 | None | −45 | 0.25 | 1450 |
| 3-5 | −0.18 | 5.3 | −29 | 0.25 | 1450 |
| 3-6 | −0.18 | 5.3 | −34 | 0.25 | 1450 |
| 3-7 | −0.18 | 5.3 | −42 | 0.25 | 1450 |
| 3-8 | −0.18 | 5.3 | −45 | 0.25 | 1450 |
| 3-9 | −0.18 | 10.59 | −29 | 0.25 | 1450 |
| 3-10 | −0.18 | 10.59 | −34 | 0.25 | 1450 |
| 3-11 | −0.18 | 10.59 | −42 | 0.25 | 1450 |
| 3-12 | −0.18 | 10.59 | −45 | 0.25 | 1450 |
| 3-13 | −0.18 | 15.89 | −29 | 0.25 | 1450 |
| 3-14 | −0.18 | 15.89 | −34 | 0.25 | 1450 |
| 3-15 | −0.18 | 15.89 | −42 | 0.25 | 1450 |
| 3-16 | −0.18 | 15.89 | −45 | 0.25 | 1450 |

TABLE 4

| No | Core diameter [µm] | Relative refractive index difference of core [%] | Inter-core distance [µm] | Optical cladding diameter [µm] | Relative refractive index difference of optical cladding [%] |
|---|---|---|---|---|---|
| 4-1 | 9.87 | 0.09 | 35.1 | 72.7 | −0.39 |
| 4-2 | 9.87 | 0.09 | 44.2 | 81.8 | −0.39 |
| 4-3 | 9.87 | 0.09 | 39.1 | 76.7 | −0.39 |
| 4-4 | 9.87 | 0.09 | 47.3 | 84.9 | −0.39 |
| 4-5 | 9.87 | 0.09 | 34.4 | 72 | −0.39 |
| 4-6 | 9.87 | 0.09 | 43.5 | 81.1 | −0.39 |
| 4-7 | 9.87 | 0.09 | 38.4 | 76 | −0.39 |
| 4-8 | 9.87 | 0.09 | 46.6 | 84.2 | −0.39 |
| 4-9 | 9.87 | 0.09 | 33.1 | 70.7 | −0.39 |
| 4-10 | 9.87 | 0.09 | 42.2 | 79.8 | −0.39 |
| 4-11 | 9.87 | 0.09 | 37.1 | 74.7 | −0.39 |
| 4-12 | 9.87 | 0.09 | 45.3 | 82.9 | −0.39 |
| 4-13 | 9.87 | 0.09 | 31.3 | 68.9 | −0.39 |
| 4-14 | 9.87 | 0.09 | 40.4 | 78 | −0.39 |
| 4-15 | 9.87 | 0.09 | 35.3 | 72.9 | −0.39 |
| 4-16 | 9.87 | 0.09 | 43.5 | 81.1 | −0.39 |

| No | Relative refractive index difference of physical cladding [%] | Diameter of low refractive index portion [um] | XT [dB/100 km] | Bending loss [dB/100 t] | λcc [nm] |
|---|---|---|---|---|---|
| 4-1 | −0.22 | None | −30 | 0.24 | 1310 |
| 4-2 | −0.22 | None | −37 | 0.24 | 1310 |
| 4-3 | −0.22 | None | −46 | 0.24 | 1310 |
| 4-4 | −0.22 | None | −48 | 0.24 | 1310 |
| 4-5 | −0.22 | 4.94 | −30 | 0.24 | 1310 |
| 4-6 | −0.22 | 4.94 | −37 | 0.24 | 1310 |
| 4-7 | −0.22 | 4.94 | −46 | 0.24 | 1310 |
| 4-8 | −0.22 | 4.94 | −48 | 0.24 | 1310 |
| 4-9 | −0.22 | 9.87 | −30 | 0.24 | 1310 |
| 4-10 | −0.22 | 9.87 | −37 | 0.24 | 1310 |
| 4-11 | −0.22 | 9.87 | −46 | 0.24 | 1310 |
| 4-12 | −0.22 | 9.87 | −48 | 0.24 | 1310 |
| 4-13 | −0.22 | 14.81 | −30 | 0.24 | 1310 |
| 4-14 | −0.22 | 14.81 | −37 | 0.24 | 1310 |
| 4-15 | −0.22 | 14.81 | −46 | 0.24 | 1310 |
| 4-16 | −0.22 | 14.81 | −48 | 0.24 | 1310 |

Among the calculation examples, calculation examples 3-1, 3-5, 3-9, and 3-13 are comparative examples in terms of cross talk between counter-propagating cores, and calculation example 4-8 is a comparative example in terms of inter-core distance. The other calculation examples are examples. From the calculation examples shown in Table 1, by setting the inter-core distance to 35.9 µm or less, more preferably 33.6 µm or less, the connection can be facilitated, and at the same time, the cross talk between counter-propagating cores can be reduced to −43 dB/100 km or less and −34 dB/100 km or less, respectively, and the MCF can be suitably used for long-distance and large-capacity transfer. Further, by setting the low refractive index portion to 0.5 times or more of the core diameter, more preferably 1.0 time or more, the inter-core distance can be further reduced by 0.8 µm or more, more preferably 2.1 µm or more, as compared with the case where the low refractive index portion is not used, and connection can be further facilitated.

From the calculation examples shown in Table 2, by setting the inter-core distance to 36.5 µm or less, more preferably 33.3 µm or less, the connection can be facilitated, and at the same time, the cross talk between counter-propagating cores can be reduced to −45 dB/100 km or less and −31 dB/100 km or less, respectively, and the MCF can be suitably used for long-distance and large-capacity transfer. Further, by setting the low refractive index portion to 0.5 times or more of the core diameter, more preferably 1.0 time or more, the inter-core distance can be further reduced by 0.8 µm or more, more preferably 2.1 µm or more, as compared with the case where the low refractive index portion is not used, and connection can be further facilitated.

From the calculation examples shown in Table 3, by setting the inter-core distance to 33.8 µm or less, the connection can be facilitated, and at the same time, the cross talk between counter-propagating cores can be reduce to −42 dB/100 km or less, and the MCF can be suitably used for long-distance and large-capacity transfer. Further, by setting the low refractive index portion to 0.5 times or more of the core diameter, more preferably 1.0 time or more, the inter-core distance can be further reduced by 0.7 µm or more, more preferably 2.0 µm or more, as compared with the case where the low refractive index portion is not used, and connection can be further facilitated.

From the calculation examples shown in Table 4, by setting the inter-core distance to 39.1 µm or less, more preferably 35.1 µm or less, the connection can be facilitated, and at the same time, the cross talk between counter-propagating cores can be reduced to −46 dB/100 km or less and −30 dB/100 km or less, respectively, and the MCF can be suitably used for long-distance and large-capacity transfer. Further, by setting the low refractive index portion to 0.5 times or more of the core diameter, more preferably 1.0 time or more, the inter-core distance can be further reduced by 0.7 µm or more, more preferably 2.0 µm or more, as compared to the case where the low refractive index portion is not used, and connection can be further facilitated.

As described above, in the MCFs 1 and 1A, the cross talk between counter-propagating cores at a wavelength of 1550 nm is reduced to −30 dB/100 km or less, more preferably to −40 dB/100 km or less. In general, when MCFs are connected to each other, it is necessary to match angular positions of the MCFs around a central axis in order to make all cores face each other. When the angle deviation occurs, the center position of the core to be connected is deviated, and connection loss (fusion loss) occurs.

In the MCFs described in Non-Patent Literature 1 and Non-Patent Literature 2, since the inter-core distance is large, connection loss is likely to increase. In order to suppress the fusion loss caused by the angular deviation, it is necessary to reduce the inter-core distance. Therefore, in MCFs 1 and 1A, the inter-core distance is set to 46.5 µm or less, more preferably 41 µm or less, and still more preferably 38 µm or less. Accordingly, the distance from the gravity center of each core to the fiber axis C is reduced to 23.25 µm or less, more preferably 20.5 µm or less, and still more preferably 19 µm or less. By ideally performing the alignment in the direction perpendicular to the fiber axis at the time of connection, it is possible to suppress the core position deviation caused by the angle deviation to a low level when the positions of the gravity centers of cores of the two MCFs to be connected are matched. Therefore, in the MCFs 1 and 1A, it is possible to suppress an increase in connection loss due to angular deviation as compared to the MCF described in Non-Patent Literature 1 and Non-Patent Literature 2.

The optical fiber preform of the MCF 1 is manufactured by, for example, integrally forming a pair of core portions serving as the pair of cores 10 and an optical cladding portion serving as the optical cladding 21 and then providing a physical cladding portion serving as the physical cladding 22 around the optical cladding portion. In this manufacturing method, it is easier to form the physical cladding portion thick than to form the optical cladding portion thick. This point also applies to the manufacturing method of the optical fiber preform of the MCF 1A. In the MCFs 1 and 1A, since the inter-core distance is small, the optical cladding diameter can be made small and the physical cladding 22 can be made thick accordingly. Therefore, productivity can be improved.

In the MCFs 1 and 1A, the bending loss at a wavelength of 1625 nm when the MCF is wound in an annular shape with a radius of 30 mm is 0.50 dB/100 turns or less, and more preferably 0.25 dB/100 turns or less. The cable cut-off wavelength is 1530 nm or less, and more preferably 1470 nm or less. For this reason, it is possible to interconnect with optical fibers conforming to widely used ITU-T G. 654A to D, and more preferably, even when there is a manufacturing variation of the MCF that may normally occur, the inter-connectivity is secured.

The MCFs described in Non-Patent Literatures 1 and 2 have a structure in which the refractive index of the cladding is uniform, and thus have a problem in that a design solution range satisfying characteristics required for cross talk between counter-propagating cores, bending loss, and cable cut-off wavelength is narrow. In contrast, in the MCFs 1 and 1A, the cladding 20 includes, in addition to the optical cladding 21, a physical cladding 22 having a refractive index greater than or equal to the refractive index of the optical cladding 21. This introduces a refractive index step at the interface between the optical cladding 21 and the physical cladding 22, thereby further reducing the inter-core distance. As a result, the design tolerance of bending loss and cable cut-off wavelength can be increased. That is, it is possible to improve the controllability of the cable cut-off wavelength in the fiber design stage while suppressing the bending loss.

In the MCFs 1 and 1A, the relative refractive index difference of the physical cladding 22 with respect to the optical cladding 21 is 0.1% or more 0.4% or less. Therefore, in the MCFs 1 and 1A, the inter-core distance can be reliably reduced. As a result, the design tolerance of bending loss and cable cut-off wavelength can be reliably increased.

The MCF 1A further includes a low refractive index portion between the pair of cores 10. As a result, the inter-core crosstalk is reduced and the design margin regarding the crosstalk is increased. Therefore, by using this margin, it is possible to further reduce the inter-core distance while keeping the crosstalk low. Therefore, it is possible to further suppress an increase in connection loss due to the angular deviation.

Since the optical transmission system 40 includes the MCF 1 or the MCF 1A, it is possible to suppress an increase in connection loss while reducing cross talk between counter-propagating cores.

The MCFs 1 and 1A may be applied to a branch line branching from a main line of an optical submarine cable, for example. Since the transfer distance of such the branch line is shorter than that of the main line, the crosstalk characteristics required for the fiber are reduced. Therefore, it is easier to reduce the inter-core distance of the MCFs 1 and 1A. In the branch line, a signal propagating in a direction away from the branch point from the main line and a signal propagating in a direction toward the branch point are propagated in opposite direction to each other by the pair of cores 10. Accordingly, cross talk between counter-propagating cores may be easily suppressed.

In the MCFs 1 and 1A, diameters, materials, additive elements, or refractive index distributions of the pair of cores 10 may be different from each other. By making the characteristics of the pair of cores 10 different from each other, propagation constants of light waves propagating through the cores 10 can be made different from each other.

Accordingly, cross talk between counter-propagating cores may be suppressed as compared to a case where the characteristics of the pair of cores 10 are the same. In addition, it is possible to reduce the inter-core distance necessary to secure the same level of crosstalk characteristics as when the pair of cores 10 are the same. Thus, connection loss due to angular deviation can be reduced.

REFERENCE SIGNS LIST 1, 1A MCF
1a, 1b fiber end
10 core
20 cladding
21 optical cladding
22 physical cladding
30 low refractive index portion
40 optical transmission system
41, 42, 43, 44 optical transceiver
45, 46 signal light
50A, 50B measurement system
51, 53 optical transmitter
52, 54 optical receiver
55, 56 incident light
55a, 56a light
C fiber axis
C1, C2 transfer path

The invention claimed is:

1. An uncoupled multi-core optical fiber comprising:
   a pair of cores, wherein diameters, materials, additive elements, or refractive index distributions of the pair of cores are different from each other, such that propagation constants of light waves propagating through the pair of cores are different from each other;
   a cladding that covers both of the pair of cores; and
   a low refractive index portion disposed between the pair of cores, being spaced apart from the pair of cores, and having a refractive index lower than a refractive index of the cladding and a diameter of at least 0.5 times a diameter of each of the pair of cores,
   wherein a diameter of the cladding is 124 μm or more and 126 μm or less,
   a distance between centers of the pair of cores is 46.5 μm or less, and
   cross talk between counter-propagating cores at a wavelength of 1550 nm is −30 dB/100 km or less.

2. The uncoupled multi-core optical fiber according to claim 1, wherein a bending loss at a wavelength of 1625 nm when wound in an annular shape with a radius of 30 mm is 0.25 dB/100 turns or less.

3. The uncoupled multi-core optical fiber according to claim 1, wherein a cable cut-off wavelength is 1530 nm or less.

4. The uncoupled multi-core optical fiber according to claim 1, wherein the cladding comprises:
   an optical cladding covering the pair of cores; and
   a physical cladding surrounding the optical cladding and having a refractive index greater than or equal to a refractive index of the optical cladding.

5. The uncoupled multi-core optical fiber according to claim 4, wherein a relative refractive index difference of the physical cladding with respect to the optical cladding is 0.1% or more 0.4% or less.

6. An optical transmission system comprising:

the uncoupled multi-core optical fiber according to claim 1; and an optical transmitter and an optical receiver connected to both ends of each of the pair of cores.

* * * * *